United States Patent [19]
Yom

[11] Patent Number: 5,781,589
[45] Date of Patent: Jul. 14, 1998

[54] DIGITAL SLOPE DETECTOR AND METHOD

[75] Inventor: Dong Hong Yom, Cupertino, Calif.

[73] Assignee: Harris Corporation, Melbourne, Fla.

[21] Appl. No.: 426,250

[22] Filed: Apr. 21, 1995

[51] Int. Cl.$^6$ ............................................. H04L 27/06
[52] U.S. Cl. ................................... 375/340; 375/261
[58] Field of Search ............................ 375/340, 261, 375/235, 324; 364/724.16

[56] References Cited

U.S. PATENT DOCUMENTS

| | | | |
|---|---|---|---|
| 4,199,728 | 4/1980 | Carpenter | 328/114 |
| 4,647,864 | 3/1987 | Rafferty et al. | 375/322 |
| 4,812,850 | 3/1989 | Gunton et al. | 342/22 |

OTHER PUBLICATIONS

Lankl et al. "Fully Digital Adaptive Slope Equalizer for Advanced Digital"pp. 1528–33. IEEE Jun. 1992.
"A VLSI Demodulator for Digital RF Network Applications": Saulnier et al. IEEE vol. 8 No. 8 Oct. 1990.

*Primary Examiner*—T. Ghebretinsae
*Attorney, Agent, or Firm*—Rogers & Killeen

[57] ABSTRACT

A slope detector and method of detecting a slope of the passband signal spectrum in a quadrature amplitude modulation (QAM) digital radio system. The detector operates in baseband for comparing signal output powers of upper and lower sidebands of a received passband signal. The slope detector includes transversal filters for filtering I and Q channel inputs and multipliers and combiners for processing the filter outputs to provide an output that is indicative of the slope of the passband signal spectrum. The output may be a value that is translated to an instantaneous slope, or may be tri-state and indicate whether the slope is positive, zero, or negative.

16 Claims, 2 Drawing Sheets

DIGITAL SLOPE DETECTOR AND METHOD

BACKGROUND OF THE INVENTION

The present invention is directed to devices and methods for ng a slope of a magnitude spectrum of a received passband signal in a radio system, and more particularly to a digital implementation of the method in baseband.

Quadrature amplitude modulation (QAM) digital radio systems are typically equipped with a frequency domain equalizer (FDE) for improving the system signature. The FDE (also known as a slope equalizer) corrects the slope in a magnitude spectrum of a received passband signal for errors introduced by a transmission channel or by the radio system. To this end, an FDE typically will include a slope detector for detecting whether there is a slope to be corrected. The slope detector compares the signal output powers of upper side band (USB) and lower side band (LSB) of the received signal to detect any slope in the magnitude spectrum.

Slope detectors of the prior art consist of USB and LSB bandpass filters (BPF) and a comparator. Such slope detectors may be implemented in passband or baseband using analog circuits and require numerous analog components, such as inductors, capacitors, and amplifiers, and require adjustments for the center frequency, bandwidth and level. All of these increase manufacturing costs.

Accordingly, it is an object of the present invention to provide a novel method and device for digital detection of the slope in baseband that obviates the problems of the prior art.

It is a further object of the present invention to provide a novel digital slope detector and method operating in baseband for comparing signal output powers of upper and lower sidebands of a received passband signal in a quadrature amplitude modulation (QAM) radio system.

It is yet a further object of the present invention to provide a novel digital slope detector and method operating in baseband with pairs of in-phase and quadrature filters for providing convolutions of the demodulated I-channel and Q-channel baseband signals on p(n)cos(Bn) and on p(n)sin (Bn), where p(n) is an impulse response of a low pass filter centered on baseband, and B is an angular frequency offset from a carrier angular frequency of the centers of upper and lower side bands in the passband spectrum.

It is still a further object of the present invention to provide a novel digital slope detector and method that uses simple logic blocks to provide an output indicative of an instantaneous slope.

It is another object of the present invention to provide a novel digital slope detector and method that considers only the polarity of the I and Q channel inputs in a series of sign comparators and combiners to provide an output indicative of an instantaneous slope.

It is yet another object of the present invention to provide a novel digital slope detector and method that considers the magnitude and polarity of the I and Q channel inputs in a series of comparators and combiners to provide an output indicative of an instantaneous slope.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
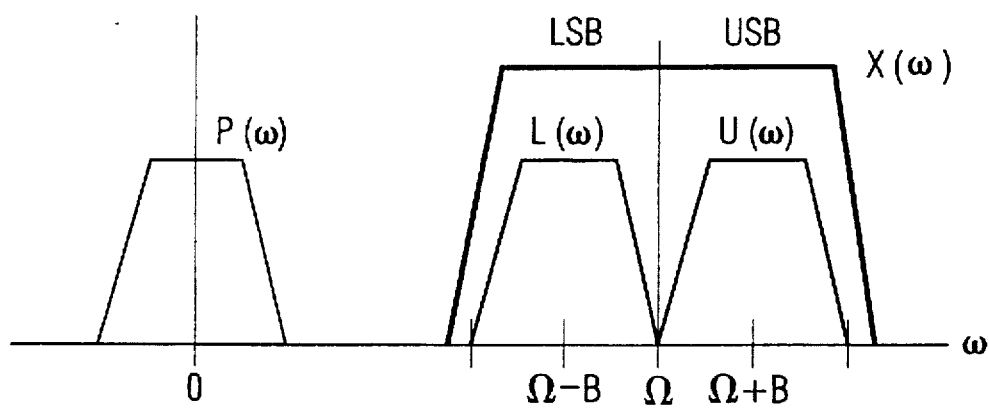
FIG. 1 illustrates bandpass filtering.

In an embodiment of the present invention, and with reference to FIG. 1, the receiver passband signal, x(t), in a QAM radio system can be represented as:

$$x(t)=i(t) \cos (\Omega t) - q(t) \sin (\Omega t) \qquad (1)$$

where i(t) is the demodulated I-channel baseband signal, q(t) is the demodulated Q-channel baseband signal, and $\Omega$ is the carrier angular frequency. Its frequency domain representation, $X(\omega)$, is:

$$X(\omega)=I(\omega-\Omega)+I(\omega+\Omega)-jQ(\omega+\Omega)+jQ(\omega+\Omega) \qquad (2)$$

where $I(\omega)$ and $Q(\omega)$ are Fourier transforms of i(t) and q(t) respectively. An upper side band (USB) bandpass filter (BPF) whose center frequency is $\Omega+B$ has a transfer function, $U(\omega)$, $$U(\Omega)=P(\omega-\Omega-B)+P(\omega+\Omega+B) \qquad (3)$$

where $P(\omega)$ is the transfer function of a low-pass filter. If we apply the USB BPF to the receiver passband signal, x(t), then the USB BPF output spectrum will be:

$$X(\omega)U(\omega)=X(\omega)[P(\omega-\Omega-B)+P(\omega+\Omega+B)] \qquad (4)$$

If the USB BPF output signal is demodulated, the I-channel baseband output spectrum of the USB BPF, $UI(\omega)$, will be:

$$UI(\omega)=I(\omega)[P(\omega+B)+P(\omega-B)]-jQ(\omega)[P(\omega+B)-P(\omega-B)] \qquad (5)$$

and the Q-channel baseband output spectrum of the USB BPF, $UQ(\omega)$, will be:

$$UQ(\omega)=Q(\omega)[P(\omega+B)+P(\omega-B)]+jI(\omega)[P(\omega+B)-P(\omega-B)] \qquad (6)$$

Utilizing that $P(\omega+B)+P(\omega-B)$ is the Fourier transform of p(t) cos (Bt) and that $$jP(\omega+B)-jP(\omega-B) \qquad (7)$$

is the Fourier transform of p(t) sin (Bt), where p(t) is the impulse response of the low-pass filter, $P(\omega)$, the baseband outputs of the USB BPF will be:

$$u\,ui(t)=i(t)*c(t)-q(t)*s(t)$$

and $$uq(t)=q(t)*c(t)+i(t)*s(t) \qquad (8)$$

where $$c(t)=p(t)\cos(Bt)$$

and $$s(t)=p(t)\sin(Bt) \quad (9)$$

and * is the convolution operator, which may be defined as:

$$a(t)*b(t) = \int_{-\infty}^{\infty} a(\tau)b(t-\tau)d\tau \quad (10)$$

Similarly, the baseband outputs of the lower side band (LSB) BPF whose center frequency is $\Omega$–B will be:

$$li(t)=i(t)*c(t)+q(t)*s(t)$$

and $$lq(t)=q(t)*c(t)-i(t)*s(t) \quad (11)$$

By way of further explanation, the baseband realization of passband bandpass filters may be seen in complex notation for the QAM signal. Let the in-phase and quadrature signals be the real and imaginary parts of the complex signal respectively. Then, the baseband signal can be represented as:

$$i(t)+jq(t) \quad (12)$$

and the complex QAM modulated signal can be represented as:

$$[i(t)+jq(t)]e^{j\Omega t} \quad (13)$$

Demodulation is done by multiplying $e^{-j\Omega t}$ times the complex QAM modulated signal. If p(t) is the low-pass filter impulse response, then the USB BPF will have the impulse response:

$$p(t)\,e^{j(\Omega+B)t} \quad (14)$$

Similarly, the LSB BPF will have the impulse response:

$$p(t)\,e^{j(\Omega-B)t} \quad (15)$$

Therefore, the baseband-equivalent USB BPF will have the impulse response:

$$\begin{aligned}p(t)e^{jBt} &= p(t)\cos(Bt)+jp(t)\sin(Bt) \\ &= c(t)+js(t)\end{aligned} \quad (16)$$

and the baseband-equivalent LSB BPF will have the impulse response:

$$\begin{aligned}p(t)e^{-jBt} &= p(t)\cos(Bt)-jp(t)\sin(Bt) \\ &= c(t)-js(t)\end{aligned} \quad (17)$$

The baseband-equivalent USB BPF output will be:

$$ui(t)+juq(t)=[i(t)+jq(t)]*[c(t)+js(t)] \quad (18)$$

and the baseband-equivalent LSB BPF output will be:

$$li(t)+jlq(t)=[i(t)+jq(t)]*[c(t)-js(t)] \quad (19)$$

Equations (18) and (19) show the same results as Equations (8) and (11).

A slope detector may compare the signal output powers of the USB and LSB BPFs.

$$\begin{aligned}SD\ out &= |USB\ BPF\ out|^2 - |LSB\ BPF\ out|^2 \\ &= |ui^2(t)+uq^2(t)|-|li^2(t)+lq^2(t)| \\ &= 4\,||q(t)*c(t)||i(t)*s(t)| - \\ & \quad |i(t)*c(t)||q(t)*s(t)||\end{aligned} \quad (20)$$

The slope detector of Equation (20) requires analog in-phase and quadrature filters, where their impulse responses are c(t) and s(t), respectively. Implementing these in-phase and quadrature filters in analog is a daunting task that is obviated by the present invention.

Figure 2:
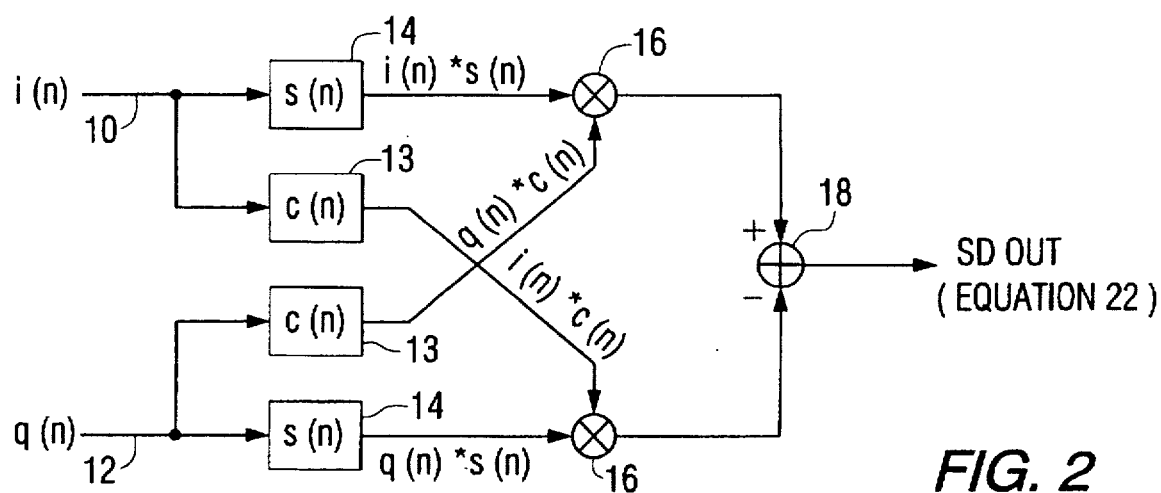
FIG. 2 is a block diagram of an embodiment of the present invention.

For a digital signal, and with reference to FIG. 2, the sampled version of c(t) and s(t) from Equation (9) will be:

$$c(n)=p(n)\cos(Bn)$$

and $$s(n)=p(n)\sin(Bn) \quad (21)$$

The SD output of the digital version of Equation (20) will be:

$$SD\ out=|q(n)*c(n)||i(n)*s(n)|-|i(n)*c(n)||q(n)*s(n)| \quad (22)$$

where * is the convolution operator defined as:

$$a(n)*b(n) = \sum_{k=-\infty}^{\infty} a(k)b(n-k) \quad (23)$$

The embodiment of FIG. 2 may include inputs 10 and 12 for I and Q channels, and in-phase and quadrature filters 13 and 14 for providing the convolutions of their inputs on c(n) and s(n). The outputs of the filters 13 and 14 may be provided to multipliers 16 and then to combiner 18 for providing the output represented by Equation (22).

The angular frequency offset, B, may be determined as follows. For the USB and LSB powers to be detected adequately, let B be the half of the bandwidth of the USB or LSB, that is, ¼ of the symbol rate. Assuming that the sampling rate is the same as the symbol rate, B is $2\pi/4$. Therefore, $$\cos(Bn)=\cos(2\pi n/4)$$

and $$\sin(Bn)=\sin(2\pi n/4) \quad (24)$$

The low-pass filter, p(n), may be determined as follows. One of the simplest forms of the low-pass filter with the bandwidth of about B, ¼ of the sampling rate, has the impulse response:

$$p(n)=\delta(n)+\delta(n-1)+\delta(n-2)+\delta(n-3) \quad (25)$$

Therefore, from Equations (21), (24), and (25), $$c(n)=p(n)\cos(Bn)=\delta(n)-\delta(n-2)$$

and $$s(n)=p(n)\sin(Bn)=\delta(n-1)-\delta(n-3)$$

Figure 3:
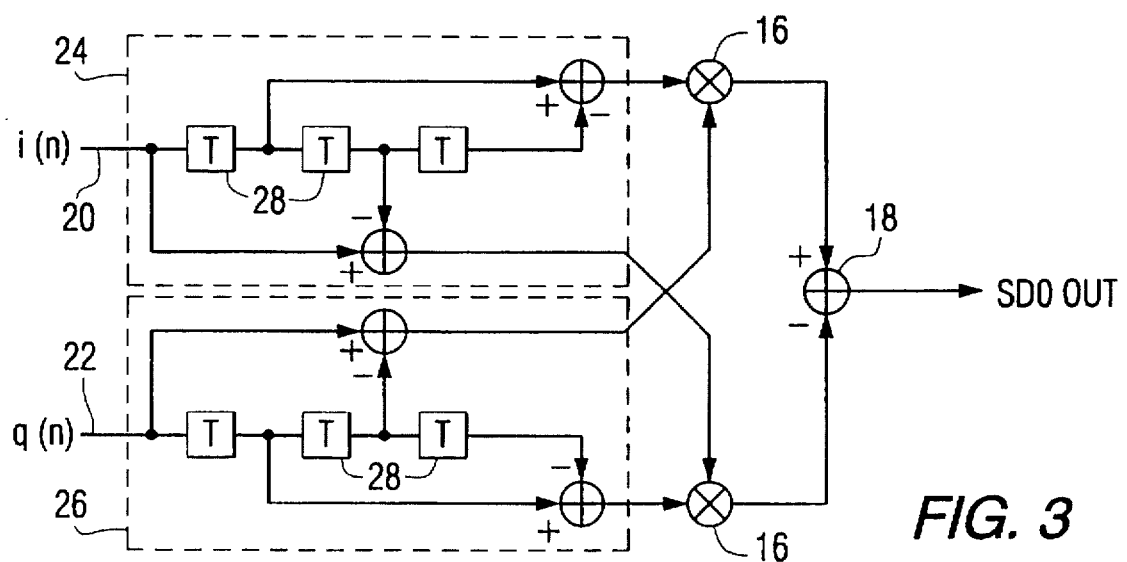
FIG. 3 is a block diagram of a digital embodiment of the present invention.

With reference now to FIG. 3, the I and Q channel digital inputs 20 and 22 may be provided to transversal filters 24 and 26, each with plural delay units 28, for providing outputs corresponding to those from filters 13 and 14 in FIG. 2. The output SDO out of the embodiment of FIG. 3 is analogous to SD out in FIG. 2.

The slope detector of the present invention may be simplified by taking only the polarity of the outputs of in-phase and quadrature filters. For example:

$$SD1 \text{ out} = \text{sgn}|q(n) - q(n-2)|\text{sgn}|i(n-1) - i(n-3)| - \quad (26)$$

$$\text{sgn}|i(n) - i(n-2)|\text{sgn}|q(n-1) - q(n-3)|$$

This embodiment requires simple logic blocks.

Further simplification is possible if only the polarity of the baseband signals is used.

$$SD2 \text{ out} = \text{sgn } |\text{sgn}|q(n)| - \quad (27)$$

$$\text{sgn}|q(n-2)||\text{sgn}(\text{sgn}|i(n-1)| - \text{sgn}|i(n-3)|| - \text{sgn } |\text{sgn}|i(n)| -$$

$$\text{sgn}|i(n-2)||\text{sgn}|\text{sgn}|q(n-1)| - \text{sgn}|q(n-3)|||$$

This embodiment requires very simple logic blocks, although may have slope detection performance that is worse than SD1.

Figure 4:
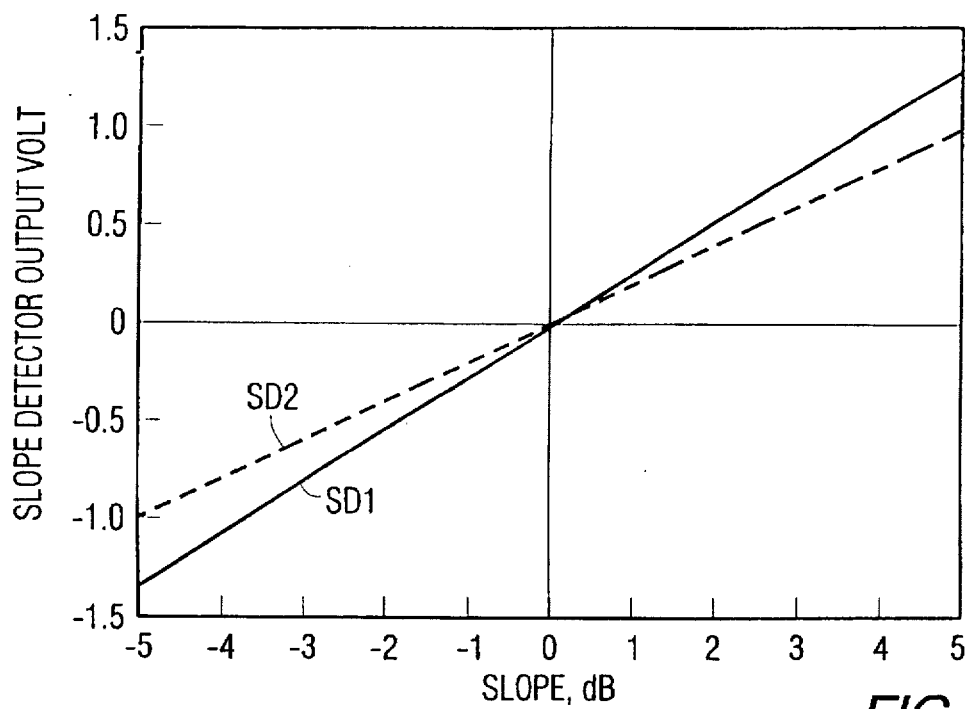
FIG. 4 is a graph illustrating slope (dB) versus slope detector output for two embodiments of the present invention.

The SD out signal may correspond to a slope, such as illustrated in FIG. 4. The SD1 slope detector shows higher detector gain than SD2, although the circuit complexity of the SD1 embodiment is greater than that of the SD2 embodiment. Alternatively, the output may simply indicate whether the slope is positive, zero, or negative.

Figure 5:
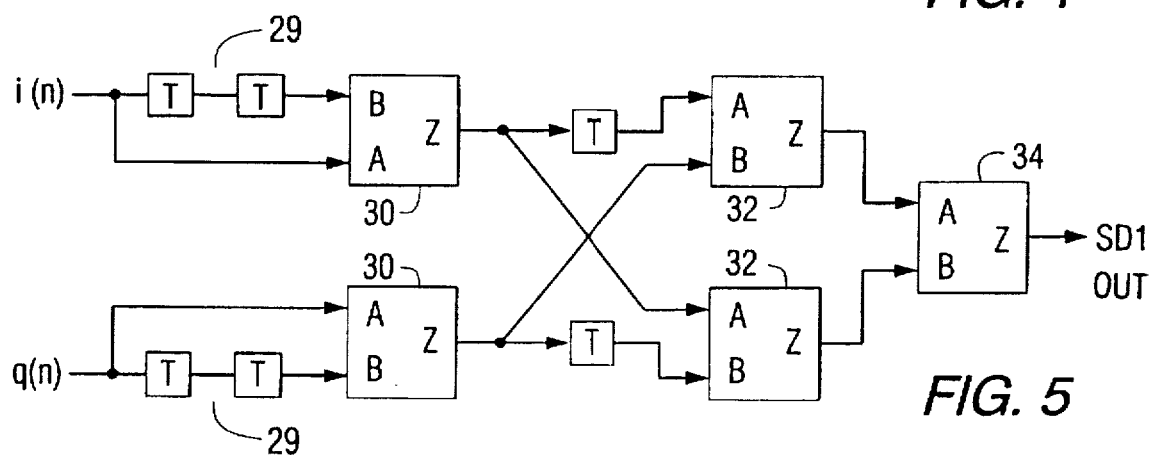
FIG. 5 is a block diagram illustrating an embodiment of the filter output limited version of the present invention that provides SD1.

A block diagram of an embodiments of SD1 is illustrated in FIG. 5. Inputs i(n) and q(n) are provided through two delay units 29 and also directly to magnitude comparators 30 that consider both magnitude and sign of the input. In magnitude comparators 30:

IF A>B THEN Z ←+1

ELSE IF A<B THEN Z ←−1

ELSE z ←0

The outputs from magnitude comparators 30 are provided through a delay unit and also directly, as indicated, to sign multipliers 32. In sign multipliers 32:

IF A>0 and B>0 THEN Z ←+1

ELSE IF A>0 and B<0 THEN Z ←−1

ELSE IF A<0 and B>0 THEN Z ←−1

ELSE IF A<0 and B <0 THEN Z ←+1

ELSE Z ←0

The outputs from sign multipliers 32 are provided to sign comparator 34, as indicated, in which only the sign information in the input is considered. In sign comparator 34:

IF A>B THEN Z ←+1

ELSE IF A<B THEN Z ←−1

ELSE Z ←0

Figure 6:
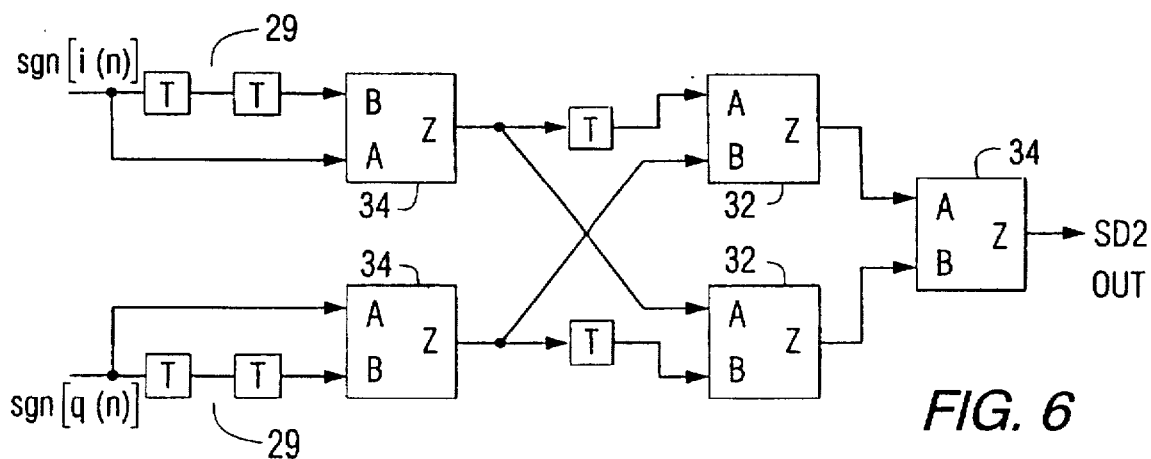
FIG. 6 is a block diagram illustrating an embodiment of the input limited version of the present invention that provides SD2.

The block diagram of an embodiments of SD2 is illustrated in FIG. 6, and is similar to that of SD1, except that further sign comparators 34 are substituted for magnitude comparators 30. Inputs sgn[i(n)] and sgn[q(n)], the limited version of the inputs, are provided directly, and through two delay units 29, to sign comparators 34 that operate as described above. The remainder of the device is as discussed in relation to SD1.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A digital slope detector operating in baseband for comparing signal output powers of upper and lower sidebands of a received passband signal, said digital slope detector being in a quadrature amplitude modulation (QAM) radio system and comprising a first pair of in-phase and quadrature filters for providing convolutions of a demodulated I-channel baseband signal on p(n)cos(Bn) and on p(n)sin(Bn), and a second pair of in-phase and quadrature filters for providing convolutions of a demodulated Q-channel baseband signal on p(n) cos (Bn) and on p(n) sin (Bn), where p(n) is an impulse response of a low pass filter centered on baseband, and B is an angular frequency offset from a carrier angular frequency of the centers of upper and lower side bands in a passband spectrum.

2. The slope detector of claim 1 further comprising a first multiplier for multiplying the Q-channel convolution on p(n) cos (Bn) by the I-channel convolution on p(n) sin (Bn) and a second multiplier for multiplying the I-channel convolution on p(n)cos(Bn) by the Q-channel convolution on p(n) sin(Bn), and a combiner for determining the difference between the outputs of said first and second multipliers, said difference indicating instantaneous slope.

3. A digital slope detector operating in baseband for comparing signal output powers of upper and lower sidebands of a received passband signal, said slope detector comprising:

I and Q channel digital baseband inputs;

delay units for delaying said inputs;

a pair of magnitude comparators for logically comparing magnitudes and signs of said inputs to outputs from said delay units;

a pair of sign multipliers for logically multiplying outputs from said magnitude comparators; and a sign comparator for logically comparing signs of outputs from said sign multipliers, to thereby provide an output indicating instantaneous slope.

4. The slope detector of claim 3 wherein said inputs are A, said outputs from said delay units are B, and said outputs from said magnitude comparators are Z, and wherein the logical comparison in said magnitude comparators is:

IF A>B THEN Z ←+1

ELSE IF A<B THEN Z ←−1

ELSE Z ←0.

5. The slope detector of claim 3 wherein said outputs from said magnitude comparators are A for said I channel inputs and B for said Q channel inputs, and said outputs from said sign multipliers are Z, and wherein the logical combination in said sign multipliers is:

IF A>0 and B>0 THEN Z ←+1

ELSE IF A>0 and B<0 THEN Z ←−1

ELSE IF A<0 and B>0 THEN Z ←−1

ELSE IF A<0 and B<0 THEN Z ←+1

ELSE Z ←0.

6. The slope detector of claim 3 wherein said outputs from said sign multipliers are A and B, and said output from said sign comparator is Z, and wherein the logical comparison in said sign comparator is:

IF A>B THEN Z ←+1

ELSE IF A<B THEN Z ←−1

ELSE Z ←0.

7. A digital slope detector operating in baseband for comparing signal output powers of upper and lower sidebands of a received passband signal, said slope detector comprising:

I and Q channel digital baseband inputs;

delay units for delaying said inputs;

a pair of first sign comparators for logically comparing the signs of said inputs to outputs from said delay units;

a pair of sign multipliers for logically multiplying outputs from said first sign comparators; and a second sign comparator for logically comparing signs of outputs from said sign multipliers, to thereby provide an output indicating instantaneous slope.

8. The slope detector of claim 7 wherein said inputs are A, said outputs from said delay units are B, and said outputs from said first sign comparators are Z, and wherein the logical comparison in said first sign comparators is:

IF A>B THEN Z ←+1

ELSE IF A<B THEN Z ←−1

ELSE Z ←0.

9. The slope detector of claim 7 wherein said outputs from said sign comparators are A for said I channel inputs and B for said Q channel inputs, and said outputs from said sign multipliers are Z, and wherein the logical combination in said sign multipliers is:

IF A>0 and B>0 THEN Z ←+1

ELSE IF A>0 and B<0 THEN Z ←−1

ELSE IF A<0 and B>0 THEN Z ←−1

ELSE IF A<0 and B<0 THEN Z ←+1

ELSE Z ←0.

10. The slope detector of claim 7 wherein said outputs from said sign multipliers are A and B, and said output from said second sign comparators is Z, and wherein the logical comparison in said second sign comparator is:

IF A>B THEN Z ←+1

ELSE IF A<B THEN Z ←−1

ELSE Z ←0.

11. A method of detecting a slope digitally in baseband, the method comprising the steps of:

(a) receiving I and Q channel digital baseband inputs;

(b) delaying the I and Q channel inputs in delay units;

(c) logically comparing signs of the I and Q channel inputs to outputs from the delay units;

(d) logically multiplying results from the sign comparisons; and (e) logically comparing signs of outcomes of the multiplied results, to thereby provide an output indicating instantaneous slope.

12. The method of claim 11 wherein the step of logically comparing the signs of the I and Q channel inputs further comprises the step of logically comparing the magnitudes of the I and Q channel inputs.

13. A method of detecting passband spectrum slope from I-channel and Q-channel baseband signals in quadrature amplitude modulation (QAM) radio receivers, said method comprising:

sampling I-channel and Q-channel baseband signals at a symbol rate producing signals $i(n)$ and $q(n)$ respectively;

forming two product waveforms $(i(n)*p(n) \sin(Bn)) \times (q(n)*p(n) \cos(Bn))$ $(q(n)*p(n) \sin(Bn)) \times (i(n)*p(n) \cos(Bn))$ wherein $p(n)$ is an impulse response of a digital low pass filter and B is an angular frequency offset from a carrier angular frequency of the centers of upper and lower side bands in a passband spectrum; and combining the two product waveforms to produce the passband spectrum slope as the difference between the two product waveforms.

14. The method of claim 13 wherein $B=2\pi/4$.

15. The method of claim 13 wherein $p(n)=\delta(n)+\delta(n-1)+\delta(n-2)+\delta(n-3)$.

16. The method of claim 15 wherein $B=2\pi/4$.

* * * * *